(12) United States Patent
Ringgenberg (10) Patent No.: US 10,279,421 B2
(45) Date of Patent: May 7, 2019

(54) WELLBORE SERVICING ASSEMBLIES AND METHODS OF USING THE SAME

(71) Applicant: Halliburton Energy Services, Inc., Houston, TX (US)

(72) Inventor: Paul David Ringgenberg, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 537 days.

(21) Appl. No.: 15/025,161

(22) PCT Filed: Oct. 31, 2013

(86) PCT No.: PCT/US2013/067802
§ 371 (c)(1),
(2) Date: Mar. 25, 2016

(87) PCT Pub. No.: WO2015/065439
PCT Pub. Date: May 7, 2015

(65) Prior Publication Data
US 2016/0228976 A1    Aug. 11, 2016

(51) Int. Cl.
| | | |
|---|---|---|
| *E21B 41/00* | (2006.01) | |
| *B23K 20/08* | (2006.01) | |
| *E21B 41/02* | (2006.01) | |
| *B23K 103/04* | (2006.01) | |

(52) U.S. Cl.
CPC .............. *B23K 20/08* (2013.01); *E21B 41/00* (2013.01); *E21B 41/02* (2013.01); *B23K 2103/04* (2018.08); *B23K 2103/05* (2018.08)

(58) Field of Classification Search
CPC ......... E21B 41/00; E21B 41/02; B23K 20/08; B23K 20/085
See application file for complete search history.

(56) References Cited

U.S. PATENT DOCUMENTS

| | | | |
|---|---|---|---|
| 3,167,122 A | 1/1965 | Lang | |
| 3,940,049 A | 2/1976 | Richter et al. | |
| 3,955,741 A * | 5/1976 | Hofer | B23K 20/08 228/2.5 |
| 4,272,005 A | 6/1981 | Jackson et al. | |
| 4,342,609 A | 8/1982 | Beatovic et al. | |
| 4,662,450 A | 5/1987 | Haugen | |
| 4,981,250 A * | 1/1991 | Persson | B23K 20/085 228/107 |

(Continued)

FOREIGN PATENT DOCUMENTS

WO    2009-146158 A1    12/2009

OTHER PUBLICATIONS

International Search Report and Written Opinion issued in related PCT Application No. PCT/US2013/067802 dated Jul. 21, 2014, 15 pages.

(Continued)

*Primary Examiner* — Daniel P Stephenson
(74) *Attorney, Agent, or Firm* — John W. Wustenberg; Baker Botts L.L.P.

(57) ABSTRACT

A method of making a downhole servicing tool comprising explosively welding a corrosion resistant material to a corrodible surface of the downhole servicing tool to yield a coated surface, wherein the coated surface comprises an explosively-welded corrosion resistant material.

33 Claims, 4 Drawing Sheets

(56) References Cited

U.S. PATENT DOCUMENTS

| | | | | |
|---|---|---|---|---|
| 5,156,207 | A | * | 10/1992 | Haugen ................. E21B 34/108 166/142 |
| 5,531,369 | A | * | 7/1996 | Richman ................. B23K 20/08 228/107 |
| 6,494,259 | B2 | | 12/2002 | Surjaatmadja |
| 6,533,040 | B2 | | 3/2003 | Gondouin |
| 6,749,894 | B2 | | 6/2004 | Subramanian et al. |
| 6,953,141 | B2 | | 10/2005 | Haugen |
| 7,530,485 | B1 | * | 5/2009 | Brasher ................. B23K 20/085 228/107 |
| 7,683,802 | B2 | | 3/2010 | Madhavan et al. |
| 8,344,905 | B2 | | 1/2013 | Madhavan et al. |
| 9,796,043 | B2 | * | 10/2017 | Schoorl ................. B23K 20/08 |
| 2007/0044960 | A1 | * | 3/2007 | Lovell ................... E21B 17/206 166/250.07 |
| 2007/0169939 | A1 | | 7/2007 | Costa et al. |
| 2008/0224413 | A1 | | 9/2008 | Doane et al. |
| 2002/0277452 | | | 11/2008 | Castellins et al. |
| 2009/0151550 | A1 | * | 6/2009 | Stol ........................ B23K 20/08 89/36.02 |
| 2011/0232290 | A1 | * | 9/2011 | Mohr ..................... B21K 25/00 219/78.02 |
| 2012/0175128 | A1 | | 7/2012 | Brady |
| 2012/0312528 | A1 | * | 12/2012 | Rayssiguier .......... E21B 17/026 166/244.1 |
| 2013/0014956 | A1 | | 1/2013 | Hughes et al. |
| 2016/0201416 | A1 | * | 7/2016 | Gendre ................... B23P 15/34 166/55.7 |
| 2016/0228976 | A1 | * | 8/2016 | Ringgenberg .......... E21B 41/02 |

OTHER PUBLICATIONS

Chen, W-C., & Petersen, C. W., "Corrosion Performance of Welded CRA-Lined Pipes for Flowlines", Offshore Technology Conference. (Jan. 1, 1991).

Smith, Liane, "Engineering with Clad Steel", Nickel Institute, 2012 at https://www.nickelinstitute.org/TechnicalLiterature/Technical%20Series/10064_EngineeringWithCladSteel2ndEd.aspx.

Cutter, David, "What you can do with explosion welding," Welding Journal, vol. 85, No. 7 (Jul. 2006), pp. 38-43.

Joshi, Amit, "Introduction to Explosive Welding" at http://www.metalwebnews.com/howto/explosive-welding/explosive-welding.html.

"Omni DT Circulating Valve", Halliburton Energy Services, Inc., Document No. H07826 (Apr. 2012), 2 pages.

"5-in DynaString Gauge Carrier", Halliburton Energy Services, Inc., Document No. H06360 (Jul. 2008), 2 pages.

International Preliminary Report on Patentability issued in related Application No. PCT/US2013/067802, dated May 12, 2016 (12 pages).

* cited by examiner

FIG. 2C DETAIL B

FIG. 2B SECTION A-A

FIG. 3

FIG. 4

WELLBORE SERVICING ASSEMBLIES AND METHODS OF USING THE SAME

CROSS-REFERENCE TO RELATED APPLICATION

The present application is a U.S. National Stage Application of International Application No. PCT/US2013/067802 filed Oct. 31, 2013, which is incorporated herein by reference in its entirety for all purposes.

BACKGROUND

Natural resources such as gas, oil, and water residing in a subterranean formation or zone are usually recovered by drilling a wellbore down to the subterranean formation and using and/or installing a variety of equipment thereon. Generally, the equipment associated with the wellbore is susceptible to corrosion, such as for example internal corrosion that may be due to produced fluids, external corrosion that may be due to equipment surfaces contacting formation fluids, etc. Thus, an ongoing need exists for more effective compositions and methods of preventing corrosion in wellbores and/or subterranean formations.

SUMMARY

Disclosed herein is a method of making a downhole servicing tool comprising explosively welding a corrosion resistant material to a corrodible surface of the downhole servicing tool to yield a coated surface, wherein the coated surface comprises an explosively-welded corrosion resistant material.

Also disclosed herein is a downhole servicing tool comprising a coated surface, wherein the coated surface comprises an explosively-welded corrosion resistant material.

Further disclosed herein is a wellbore servicing system comprising a casing string disposed within a wellbore, a conveyance string at least partially disposed within the casing string and having a downhole servicing tool incorporated therein, wherein the downhole servicing tool comprises a coated surface, and wherein the coated surface comprises an explosively-welded corrosion resistant material.

Further disclosed herein is a wellbore servicing method comprising positioning a conveyance string having a downhole servicing tool incorporated therein within a casing string disposed within a wellbore, wherein the conveyance string is positioned such that the downhole servicing tool is proximate to a zone of interest within a subterranean formation, wherein the downhole servicing tool comprises a drill stem testing tool, wherein the drill stem testing tool comprises one or more coated surfaces, wherein the coated surface comprises an explosively-welded corrosion resistant material, performing a drill stem testing operation, wherein the drill stem testing tool comprises a gauge carrier comprising one or more gauge carrier slots and one or more blank adaptors further comprising one or more gauges to log data about a natural resource reservoir, wherein the gauge carrier slot comprises at least a portion of a coated surface in sealing contact with at least a portion of an outer surface of the blank adaptor, thereby forming a sealing interface, wherein the gauge senses a condition proximate the downhole servicing tool; and retrieving data from the gauges.

Further disclosed herein is a drill stem testing tool comprising a gauge carrier comprising one or more gauge carrier slots and one or more blank adaptors further comprising one or more gauges, wherein the gauge carrier slot comprises a coated surface, wherein the coated surface comprises an explosively-welded corrosion resistant material, wherein the gauge carrier slot comprises at least a portion of the coated surface in sealing contact with at least a portion of an outer surface of the blank adaptor, thereby forming a sealing interface, wherein the gauge senses a condition proximate the drill stem testing tool.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "up-hole," "upstream," or other like terms shall be construed as generally from the formation toward the surface or toward the surface of a body of water; likewise, use of "down," "lower," "downward," "downhole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis.

Unless otherwise specified, use of the term "subterranean formation" shall be construed as encompassing both areas below exposed earth and areas below earth covered by water such as ocean or fresh water.

Disclosed herein are embodiments of wellbore servicing apparatuses, systems, and methods of using the same. Particularly, disclosed herein are one or more embodiments of a wellbore servicing system comprising a downhole servicing tool, alternatively referred to as a wellbore servicing tool, further comprising a coated surface, wherein the coated surface comprises an explosively-welded corrosion resistant material (ECRM) (e.g., corrosion resistant metal, corrosion resistant alloy, etc.).

For purposes of the disclosure herein, a wellbore servicing tool, alternatively referred to as a downhole servicing tool or more simply a downhole tool, may be defined as an operable assembly of components that performs a specific function within a wellbore environment and/or may be integrated (e.g., connected, coupled, attached, etc.) within a conveyance string (e.g., a work string, a drill string, a drill stem, a tool string, a segmented tubing string, a jointed tubing string, a coiled tubing string, a wireline string, a slickline string, etc.) and placed downhole within a wellbore. For example, a downhole servicing tool may be connected to a lower end of a conveyance string and placed in a desired location in the wellbore (e.g., adjacent an area to be serviced via the servicing tool). Nonlimiting examples of specific functions that may be performed by a downhole servicing tool include measuring and/or monitoring a downhole environment parameter, such as for example a downhole pressure, a downhole temperature; sealing and/or isolating zones or portions of a subterranean formation; actuating a component or a sub-component of a tool, such as for example opening and/or closing a valve, opening and/or closing a port, allowing fluid passage between an interior flowbore and/or an exterior flowbore (e.g., annular flowbore); and the like. In an embodiment, a downhole servicing tool is dynamic within a wellbore and/or subterranean formation, i.e., the downhole servicing tool is characterized by performing or undergoing work, change, activity, progress, movement, action, articulation, and the like, upon being introduced to a wellbore and/or subterranean formation in order to facilitate completion of a desired wellbore service.

In an embodiment, a downhole servicing tool is any suitable combination of components assembled and placed within a wellbore for purposes of performing a wellbore service selected from the following: drilling, testing, completing, working over, stimulating, perforating, fracturing, repairing, otherwise servicing the wellbore, or in any way preparing the wellbore for the recovery of materials residing in a subterranean formation penetrated by the wellbore. For example, a downhole servicing tool may be a carrier, a gauge carrier, a gauge, a recorder, a port, a slot, a carrier gun, a piston assembly, a valve, a bypass valve, a valve assembly, a shut-in valve, a circulation valve, a reverse circulation valve, a safety valve, a drain valve, a drill stem testing tool, a nozzle, a packer, a safety joint, a sample container, a perforating gun, a perforated pipe, a shoe, a sampling tool, a logging tool, a fracturing tool, a drilling tool, a completion tool, a perforating tool, a repair tool, a work over tool, or any components thereof, etc.

In an embodiment, the downhole servicing tool comprises a port. Generally, a port is an aperture/opening in a downhole servicing tool having a cross-sectional area (e.g., a circular cross section), which port provides a flow passage for fluids between the interior of the tool (e.g., interior flowbore/flowpath) and the exterior of the tool (e.g., exterior flowbore/flowpath, such as for example an annular flowbore formed between an exterior of the tool and an adjacent wellbore wall or casing wall). In an embodiment, a port may be selectively openable and/or closeable to fluid flow.

For purposes of the disclosure herein, components present in the wellbore or work string that are primarily for conveyance (e.g., transport or movement within the wellbore) and/or for spacing purposes (e.g., to provide lengths or distances between operable components) are not considered downhole servicing tools. Specific nonlimiting examples of components that generally would not be considered downhole servicing tools (absent modification to include operable functionality therein) include a pipe, a pipeline, a tubular, a conveyance string (e.g., a work string, a drill string, a drill stem, a segmented tubing string, a jointed tubing string, a coiled tubing string, a wireline string, a slickline string, etc.), a wellbore casing, a casing liner, etc. An example of a modification to include operable functionality is use of casing that has selectively opening windows and/or ports to provide fluid flow between the wellbore and adjacent formation, and such modified casing may be considered a downhole servicing tool in some embodiments. In various embodiments, a conveyance string may be used to convey/position a downhole servicing tool in a wellbore and/or subterranean formation; however, the conveyance string does not constitute a downhole servicing tool, as the conveyance string is static in function (as opposed to dynamic in function) within a wellbore and/or subterranean formation, i.e., the conveyance string is not characterized by performing or undergoing work, change, activity, progress, movement, action, articulation, and the like, upon being introduced to a wellbore and/or subterranean formation beyond that of providing a physical connection and means for movement, placement, and/or spacing within the wellbore. The distinction between a wellbore servicing tool and a non-wellbore servicing tool (e.g., a conveyance such as jointed pipe) will be apparent to those skilled in the art in the context of a given wellbore servicing operation with the aid of the present disclosure.

In an embodiment, a downhole servicing tool may comprise a corrodible surface, wherein the corrodible surface may be exposed to a fluid (e.g., liquid, oil, silicone oil, water, brine, gas, nitrogen, $H_2S$, $CO_2$, etc.), and may consequently be susceptible to corrosion. In an embodiment, an ECRM may be explosively welded onto the corrodible surface, thereby forming a coated surface, wherein the coated surface is more resistant to corrosion than the uncoated corrodible surface.

In some embodiments, one or more ports may be coated with an ECRM, e.g., one or more ports present in a wellbore servicing tool. In an embodiment, a port may comprise a corrodible surface prior to coating with the ECRM. In an embodiment, all or a portion of the corrodible surface of one or more ports may be coated via explosive welding to provide an ECRM thereon, thereby forming a coated surface.

In an embodiment, two or more components of a downhole servicing tool may be in sealing contact (e.g., a fluid tight seal) with each other, e.g., sealingly engaged, thereby forming a sealing interface. For purposes of the disclosure herein, a sealing interface may be defined as the contact surface (e.g., engagement surface) between two components of a downhole servicing tool. For example, a first component comprising a first surface may be in sealing contact with a second component comprising a second surface, wherein at least a portion of the first surface is in sealing contact with at least a portion of the second surface, thereby forming a sealing interface, and wherein all or a portion of the first surface and/or the second surface may comprise a coated surface further comprising an ECRM.

Nonlimiting examples of sealing interfaces that may form between two or more components of a downhole servicing tool include a contact surface between slidably engaged components; a contact surface between a gauge and a slot or a port within a gauge carrier; a contact surface between a piston (e.g., an annular piston) and a tubular (e.g., a mandrel, a housing); a contact surface between a piston (e.g., a hydraulic holddown piston, such as for example a piston with a circular cross-section) and a slot or a port (e.g., a slot or a port in a body of a hydraulic holddown mechanism, such as for example a hydraulic holddown mechanism of a packer); and the like.

In an embodiment, a corrosion resistant material may be welded (e.g., applied, bonded, connected, coupled, joined, mated) onto a surface (e.g., a corrodible surface) by explosion welding, as will be disclosed herein, thereby yielding a coated surface comprising an ECRM. An ECRM may be explosively welded onto a surface by using any suitable method, such as for example explosive welding, explosion welding, EXW, explosive bonding, explosion bonding, explosive cladding, explosion cladding, and the like, and collectively these methods are referred to herein as "explosive welding."

Nonlimiting examples of corrodible surfaces present in a downhole servicing tool that are suitable for use in explosive welding include a corrodible surface in a port located in the tool (e.g., in a housing, in a hydraulic holddown mechanism of a packer), a corrodible surface in a slot on the tool, a corrodible surface on a tubular component of the tool (e.g., a sliding sleeve, piston, etc.), a corrodible surface on a mandrel of the tool, a corrodible surface in a housing of the tool, and the like, or combinations thereof.

Generally, explosive welding is a solid state or solid-phase process where welding or bonding of materials (e.g., similar materials, dissimilar materials, dissimilar metals, dissimilar metal alloys) is accomplished by accelerating one of the materials (e.g., an explosively propelled material) at extremely high velocity through the use of explosives into another material (e.g., a stationary material, substrate material, target material, or the like). As will be appreciated by one of skill in the art, and with the help of this disclosure, the stationary material comprises the corrodible surface and the explosively propelled material comprises the corrosion resistant material. For purposes of the disclosure herein, the corrosion resistant material that has been welded onto the corrodible surface is referred to herein as "explosively-welded corrosion resistant material" or "ECRM."

Explosive welding uses forces of controlled detonations of explosives to accelerate one material into another, thereby creating an atomic or metallurgical bond between such materials (e.g., fusing such materials together). An atomic or metallurgical bond is generally formed between metals or metallic materials and it involves a sharing of electrons between bonded materials. Consequently, an atomic bond displays a fluid tight seal, more specifically a fluid (e.g., a liquid, a gas) may not penetrate or enter the atomic bond. As will be appreciated by one of skill in the art, and with the help of this disclosure, a corrosion resistant material that forms an atomic bond with a corrodible surface (thereby forming a protective and/or barrier coating or boundary layer) will protect the corrodible surface from contacting a fluid (e.g., a liquid, a gas) that might promote and/or propagate corrosion of the corrodible surface, as the fluid may not penetrate the atomic bond and reach the corrodible surface.

Explosive welding is considered a cold-welding process which allows materials (e.g., metals, metal alloys) to be bonded without losing their pre-bonded properties. Although the explosion generates intense heat, the explosive welding process is so fast that there is not enough time for the heat to be transferred to the materials that are welded, and as such the materials that are welded do not experience a significant increase in temperature. As will be appreciated by one of skill in the art, and with the help of this disclosure, the geometry of the surfaces that may be subjected to explosive welding may be somewhat limited, e.g., plates, cylinders, tubes, hollow cylinders, tube sheets, etc., due to the nature of the explosive welding process.

In an embodiment, the corrodible surface and the corrosion resistant material may be subjected to explosive welding. In such embodiment, the corrodible surface and the corrosion resistant material may face each other in any suitable geometry, such as for example a corrodible surface shaped as a plate may face a corrosion resistant material shaped as another plate, wherein at least a portion of a surface of the corrosion resistant material plate facing away from the corrodible surface plate may be coated with the explosive; a corrodible surface shaped as a tube, for example a port in a downhole tool or component thereof, (e.g., a larger tube) may face a corrosion resistant material shaped as another tube (e.g., a smaller tube), wherein the corrosion resistant material tube may be disposed or placed inside the corrodible surface tube, and wherein at least a portion of a hollow portion of the corrosion resistant material tube may be coated and/or filled with the explosive; a corrosion resistant material shaped as a tube for example a port in a downhole tool or component thereof, (e.g., a larger tube) facing a corrodible surface shaped as a tube or solid cylinder (e.g., a smaller tube or cylinder), wherein the corrodible surface tube or cylinder may be disposed or placed inside the corrosion resistant material tube, and wherein at least a portion of an outer surface of the corrosion resistant material tube may be coated with the explosive; and the like. As will be appreciated by one of skill in the art, and with the help of this disclosure, when the geometry of the stationary material (e.g., the corrodible surface) and of the explosively propelled material (e.g., the corrosion resistant material) is a plate, the two plates of materials to be bonded by explosive welding may be positioned either parallel or at a slight angle with respect to each other. Further, as will be appreciated by one of skill in the art, and with the help of this disclosure, when the geometry of the stationary material (e.g., the corrodible surface) and of the explosively propelled material (e.g., the corrosion resistant material) is a tube and/or solid cylinder, for example a port in a downhole tool or component thereof, the two tubes and/or solid cylinders of materials to be bonded by explosive welding may be positioned coaxially with respect to each other.

Without wishing to be limited by theory, a distance between two materials facing each other for the explosive welding process has to be sufficient for the explosively propelled material (e.g., the corrosion resistant material) to achieve a high enough velocity to create an atomic bond with the stationary material (e.g., corrodible surface) upon impact. In an embodiment, the stationary material comprises the corrodible surface and the explosively propelled material comprises the corrosion resistant material. In an embodiment, the distance between the stationary material (e.g., the corrodible surface) and the explosively propelled material (e.g., the corrosion resistant material) may be equal to or greater than about 0.001 inches, alternatively equal to or greater than about 0.01 inches, or alternatively equal to or greater than about 0.1 inches.

In an embodiment, the explosive is a solid, such as for example a powder. In an embodiment, the explosive may be dispersed in an uniform layer across a surface of the explosively propelled material (e.g., the corrosion resistant material). In an embodiment, the explosive may be placed proximate (e.g., in contact with, adjacent, touching, next to, close to, on, etc.) the explosively propelled material (e.g., the corrosion resistant material). In an embodiment, the explosive may be placed proximate the surface of the explosively propelled material that faces away from the surface of the stationary material that will participate in the explosive welding, as opposed to the surface of the explosively propelled material that is adjacent to (i.e., faces) the surface of the stationary material that will participate in the explosive welding.

Nonlimiting examples of explosives suitable for use in the present disclosure include cyclotrimethylene trinitramine (RDX) characterized by molecular formula $C_3H_6N_6O_6$; pentaerythritol tetranitrate (PETN) characterized by molecular formula $C_5H_8N_4O_{12}$; trinitrotoluene (TNT) characterized by molecular formula $C_7H_5N_3O_6$; trinitrophenylmethylinitramine characterized by molecular formula $C_7H_5N_5O_8$, also known as tetryl; nitroguanidine characterized by molecular formula $CH_4N_4O_2$; lead azide characterized by molecular formula $Pb(N_3)_2$; ammonium nitrate characterized by molecular formula $NH_4NO_3$; ammonium nitrate sensitized with fuel oil; ammonium perchlorate characterized by molecular formula $NH_4ClO_4$; amatol; sodatol; Composition B; Composition C4; dynamite; detasheet; and the like; or combinations thereof.

When an explosive is detonated on the surface of a material (e.g., explosively propelled material, corrosion resistant material), a high pressure pulse is generated. In an embodiment, the explosive may be detonated on one end of the explosively propelled material (e.g., the corrosion resistant material). In such embodiment, the high pressure pulse propels or drives at a very high speed the explosively propelled material (e.g., the corrosion resistant material) into the stationary material (e.g., the corrodible surface). Without wishing to be limited by theory, the force of the explosion (e.g., an explosion occurring by detonating an explosive on one end of the explosively propelled material) sets up an angular collision (as opposed to a parallel or perpendicular collision) between the explosively propelled material (e.g., the corrosion resistant material) and the stationary material (e.g., the corrodible surface), and this angular collision results in a plasma jet produced between the explosively propelled material and the stationary material. The plasma jet cleans the surface of the materials (e.g., the explosively propelled material and the stationary material) to be welded by removing any impurities and allows the clean surfaces to be welded or bonded together by forming an atomic bond. The explosion drives the explosively propelled material (e.g., the corrosion resistant material) into the stationary material (e.g., the corrodible surface) under extremely high pressures, which may be in the range of from about 100,000 psi to about 10,0000,000 psi.

In an embodiment, the explosive may be detonated by using any suitable method, such as for example by using a detonating cord. A detonating cord is generally is a thin, flexible plastic tube filled with PETN or RDX, and is also known as PRIMACORD, PRIMALINE, or CORDTEX.

In an embodiment, explosive welding may be used for bonding dissimilar materials. For purposes of the disclosure herein, dissimilar materials are defined as materials that do not adhere to each other under normal conditions and/or as a result of conventional bonding methods, such as for example plating, electroplating, galvanizing, vapor deposition, and the like. In an embodiment, the stationary material (e.g., the corrodible surface) and the explosively propelled material (e.g., the corrosion resistant material) are comprised of dissimilar materials. For example, the stationary material may comprise carbon steel and the explosively propelled material may comprise a nickel alloy, wherein the carbon steel and the nickel alloy are dissimilar materials.

In an embodiment, the corrodible surface comprises low alloy steel, carbon steel, mild steel, low-carbon steel, low-alloy carbon steel, plain-carbon steel, medium carbon steel, high-carbon steel, ultra-high-carbon steel, and the like, or combinations thereof.

In an embodiment, the corrosion resistant material comprises a corrosion resistant alloy, high alloy steel, stainless steel, nickel alloy, Inconel, a corrosion resistant metal, titanium, zirconium, and the like, or combinations thereof.

In an embodiment, the corrosion resistant material may be characterized by a pre-detonation thickness of from about 0.11 mm to about 15 mm, alternatively from about 0.5 mm to about 10 mm, or alternatively from about 1 mm to about 5 mm. In an embodiment, the thickness of the corrosion resistant material may be determined by testing, e.g., corrosion resistant materials various thickness may be employed in an explosive welding process to determine a starting thickness necessary to yield an ECRM of a desired thickness, wherein parameters (e.g., the distance between the stationary material (e.g., the corrodible surface) and the explosively propelled material (e.g., the corrosion resistant material); the type and amount of explosive used; etc.) for the explosive welding may be kept the same or may be different from one testing to another. As will be appreciated by one of skill in the art, and with the help of this disclosure, a thickness of the ECRM may be less than the thickness of the corrosion resistant material used in the explosive welding process. In an embodiment, the ECRM may be characterized by a thickness of from about 0.1 mm to about 10 mm, alternatively from about 0.5 mm to about 5 mm, or alternatively from about 1 mm to about 3 mm.

In an embodiment, a corrodible surface comprising an ECRM (e.g., a coated surface) may have a corrosion rate that is from about 10 to about 10,000 times less, alternatively from about 50 to about 1,000 times less, or alternatively from about 100 to about 500 times less than the corrosion rate of the same corrodible surface in the absence of the ECRM.

Figure 1:
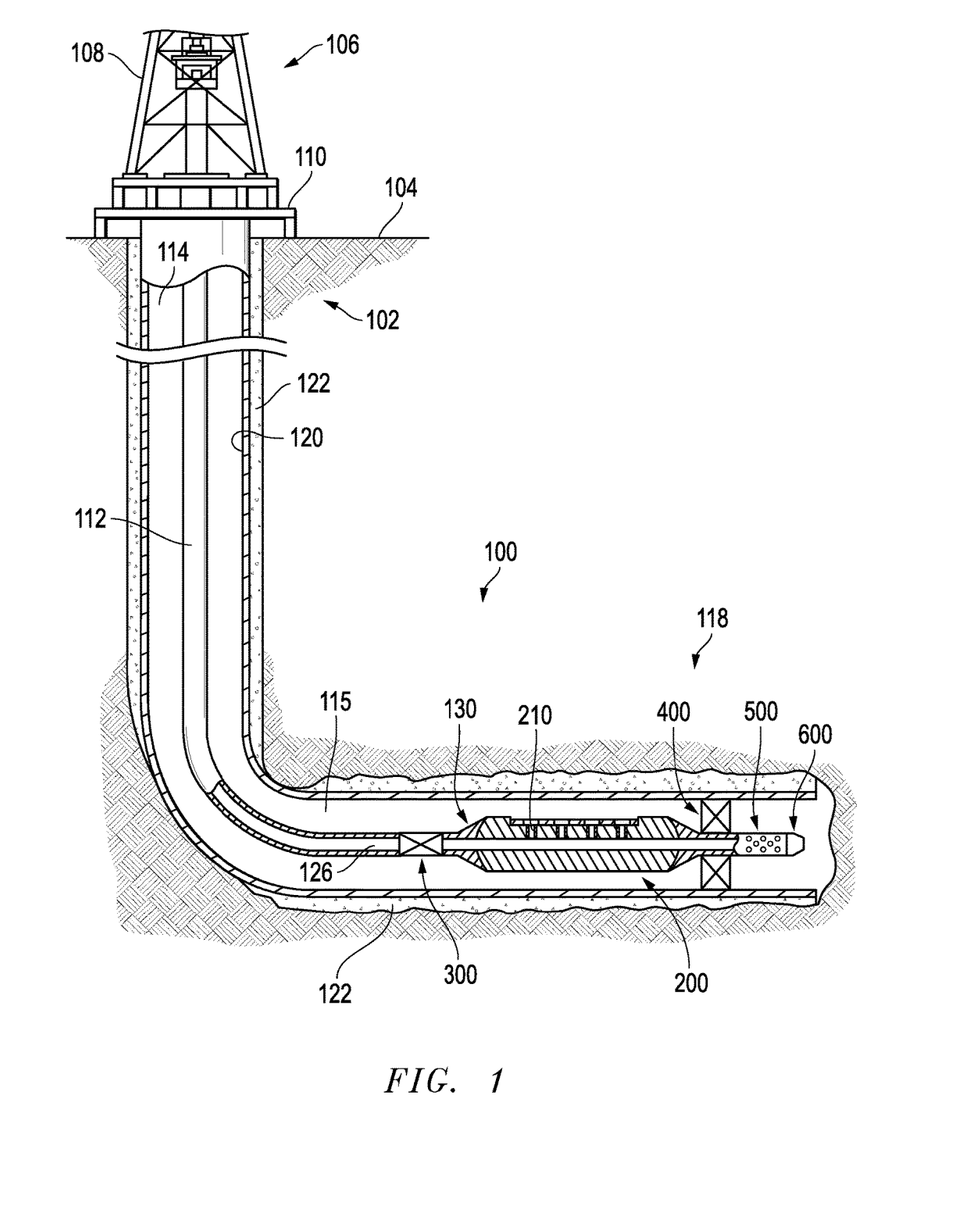
FIG. 1 is a simplified cutaway view of a wellbore servicing tool in an operating environment.

Referring to FIG. 1, an embodiment of an operating environment in which a wellbore servicing apparatus and/or system may be employed is illustrated. It is noted that although some of the figures may exemplify horizontal or vertical wellbores, the principles of the apparatuses, systems, and methods disclosed may be similarly applicable to horizontal wellbore configurations, conventional vertical wellbore configurations, and combinations thereof. Therefore, the horizontal or vertical nature of any figure is not to be construed as limiting the wellbore to any particular configuration.

As depicted in FIG. 1, the operating environment generally comprises a wellbore 114 that penetrates a subterranean formation 102 for the purpose of recovering hydrocarbons, storing hydrocarbons, disposing of carbon dioxide, or the like. Wellbore 114 may be drilled into the subterranean formation 102 using any suitable drilling technique. In an embodiment, a drilling or servicing rig 106 disposed at the surface 104 comprises a derrick 108 with a rig floor 110 through which a conveyance string 112 (e.g., a work string, a drill string, a drill stem, a segmented tubing string, a jointed tubing string, a coiled tubing string, a wireline string, a slickline string, or any other suitable conveyance, or combinations thereof) generally defining an axial flowbore 126 may be positioned within or partially within wellbore 114. The drilling or servicing rig may be conventional and may comprise a motor driven winch and other associated equipment for lowering the conveyance string into wellbore 114. Alternatively, a mobile workover rig, a wellbore servicing unit (e.g., coiled tubing units), or the like may be used to lower the conveyance string into the wellbore 114. In such an embodiment, the conveyance string may be utilized in drilling, completing, working over, stimulating, perforating, fracturing, repairing, otherwise servicing the wellbore, or in any way preparing the wellbore for the recovery of materials residing in a subterranean formation penetrated by the wellbore, or combinations thereof.

Wellbore 114 may extend substantially vertically away from the earth's surface 104 over a vertical wellbore portion, or may deviate at any angle from the earth's surface 104 over a deviated or horizontal wellbore portion 118. In alternative operating environments, portions or substantially all of wellbore 114 may be vertical, deviated, horizontal, and/or curved and such wellbore may be cased, uncased, or combinations thereof. In some instances, at least a portion of the wellbore 114 may be lined with a casing 120 that is secured into position against the formation 102 in a conventional manner using cement 122. In this embodiment, deviated wellbore portion 118 includes casing 120. However, in alternative operating environments, the wellbore 114 may be partially cased and cemented thereby resulting in a portion of the wellbore 114 being uncased. In an embodiment, a portion of wellbore 114 may remain uncemented, but may employ one or more packers (e.g., Swellpackers™, commercially available from Halliburton Energy Services, Inc.) to isolate two or more adjacent portions or zones within wellbore 114.

Referring to FIG. 1, a wellbore servicing system 100 is illustrated. In the embodiment of FIG. 1, wellbore servicing system 100 comprises a downhole servicing tool 130 incorporated within a conveyance string 112. Additionally, although the embodiment of FIG. 1 illustrates wellbore servicing system 100 incorporated within conveyance string 112, a similar wellbore servicing system may be similarly incorporated within any other suitable conveyance string (e.g., a work string, a drill string, a drill stem, a segmented tubing string, a jointed tubing string, a coiled tubing string, a wireline string, a slickline string, or any other suitable conveyance, or combinations thereof), as may be appropriate for a given servicing operation. In an embodiment, the downhole servicing tool 130 comprises a drill stem testing (DST) tool further comprising a valve assembly 300, a gauge carrier 200, a packer 400, a perforated pipe 500, and a shoe 600.

Additionally, while in the embodiment of FIG. 1, the downhole servicing tool 130 (e.g., a DST tool) comprises a gauge carrier 200 further comprising at least one coated surface 210, as will be appreciated by one of skill in the art, and with the help of this disclosure, the downhole servicing tool may comprise any suitable servicing tool (e.g., a carrier, a gauge, a recorder, a port, a slot, a carrier gun, a piston assembly, a valve, a bypass valve, a valve assembly, a shut-in valve, a circulation valve, a reverse circulation valve, a safety valve, a drain valve, a drill stem testing tool, a nozzle, a packer, a safety joint, a sample container, a perforating gun, a perforated pipe, a shoe, or any components thereof) further comprising a coated surface.

Figure 2A:
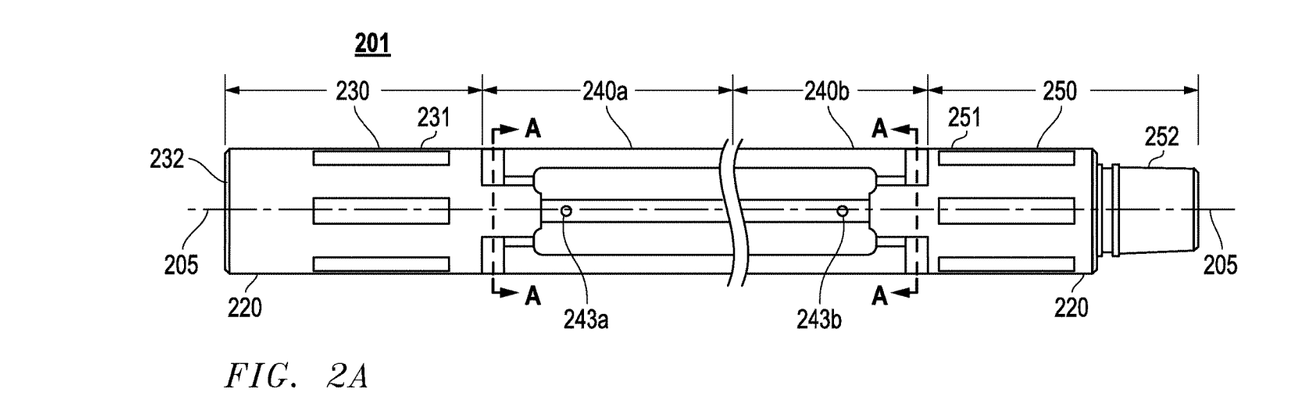
FIG. 2A is an isometric view of an embodiment of a gauge carrier.

In an embodiment, the downhole servicing tool 130 comprises a gauge carrier 201, as seen in the embodiment of FIG. 2A. Referring to the embodiment of FIG. 2A, the gauge carrier 201 generally comprises a housing 220 and may be characterized with respect to a central or longitudinal axis 205.

Figure 2B:
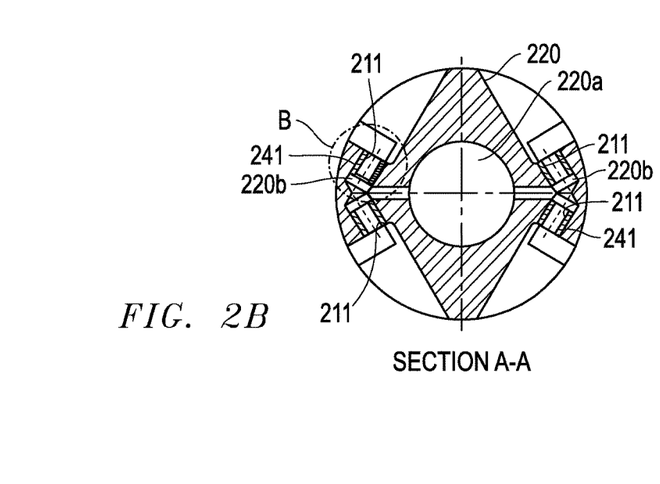
FIG. 2B is a cross-sectional view along line A-A of the gauge carrier of FIG. 2A.

In an embodiment, housing 220 may comprise a unitary structure (e.g., a single unit of manufacture, such as a continuous length of pipe or tubing). In an alternative embodiment, housing 220 may comprise two or more operably connected components (e.g., two or more coupled sub-components, such as by a threaded connection). Alternatively, a housing like housing 220 may comprise any suitable structure; such suitable structures will be appreciated by those of skill in the art upon viewing this disclosure. Housing 220 comprises a cylindrical or tubular body that generally defines a continuous flowpath 220a, as seen in FIG. 2B, that allows fluid movement through housing 220.

Referring to the embodiment of FIG. 2A, housing 220 comprises a plurality of operably connected sub-components (e.g., a plurality of coupled sub-components, such as by a threaded connection). In an embodiment, housing 220 comprises three operably connected sub-components (e.g., three coupled sub-components, such as by a threaded connection). Housing 220 generally comprises a first housing segment 230, a first gauge carrier slot portion 240a, a second gauge carrier slot portion 240b, and a second housing segment 250. In an embodiment, the first gauge carrier slot portion 240a and the second gauge carrier slot portion 240b are part of the same sub-component (e.g., a middle section of the housing 220) which may be coupled to the first housing segment 230 on an upper end, and to the second housing segment 250 on a lower end.

In an embodiment, the first housing segment 230 is located at the upper end of the housing 220. Referring to the embodiment of FIG. 2A, the first housing segment 230 generally comprises a cylindrical or tubular body 231 having a connecting surface (e.g., an internally or externally threaded surface) 232 located at the upper end of first housing segment 230. Such connecting surface 232 may be employed in making a connection to the conveyance string 112 or any other suitable component (e.g., valve assembly 300).

In an embodiment, the first gauge carrier slot portion 240a and the second gauge carrier slot portion 240b are located in the middle section of the housing 220. As will be appreciated by one of skill in the art, and with the help of this disclosure, while the embodiment of FIG. 2A shows two gauge carrier slot portions, a gauge carrier may comprise one, two, three, four, five, six, seven, eight, nine, ten, or more gauge carrier slot portions, which may be the same or different from each other. Referring to the embodiment of FIG. 2A, the first gauge carrier slot portion 240a and the second gauge carrier slot portion 240b are identical, and they are placed or integrated within housing 220 in a "mirror image" fashion. For purposes of the disclosure herein, any description related to the first gauge carrier slot portion 240a will be understood to be applicable to the second gauge carrier slot portion 240b, with the mention that all the spatial features are mirrored from the first gauge carrier slot portion 240a to the second gauge carrier slot portion 240b, wherein the mirror is considered to be perpendicular to the housing 220, e.g., perpendicular to the longitudinal axis 205. For example, referring to the embodiment of FIG. 2A, a reference to "left" for the first gauge carrier slot portion 240a becomes a reference to "right" for the second gauge carrier slot portion 240b. Similarly, referring to the embodiment of FIG. 2A, a reference to "right" for the first gauge carrier slot portion 240a becomes a reference to "left" for the second gauge carrier slot portion 240b.

In an embodiment, the first gauge carrier slot portion 240a may comprise a gauge carrier slot 241. In an embodiment, the gauge carrier slot 241 is a port. Referring to the embodiment of FIG. 2B, the first gauge carrier slot portion 240a comprises four gauge carrier slots 241 that are located in groups of two, wherein each group of two gauge carrier slots is positioned diametrically opposed with respect to the other group of two gauge carrier slots. Other numbers of gauge carrier slots may be used in different configurations, as will be apparent to those skilled in the art, and with the help of this disclosure.

Figure 2C:
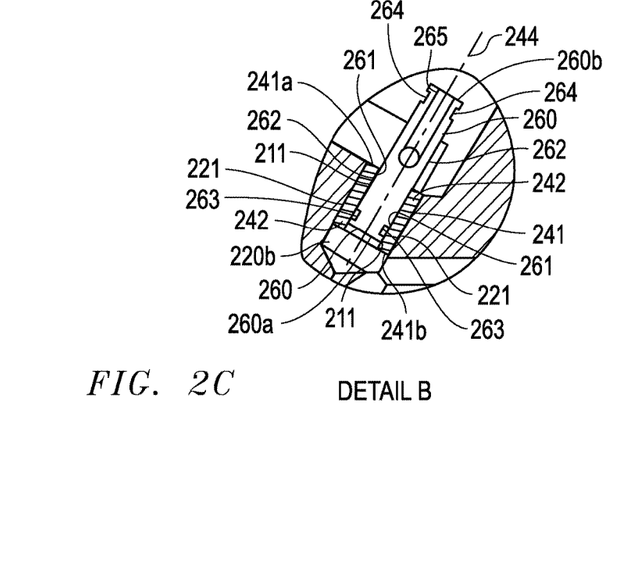
FIG. 2C is an enlarged view of detail B of the cross-sectional view of the gauge carrier of FIG. 2B.

Referring to the embodiment of FIG. 2C, the gauge carrier slot 241 may be characterized with respect to a central or longitudinal axis 244. In an embodiment, the gauge carrier slot 241 comprises a corrodible surface 221. The corrodible surface 221 represents the stationary material in an explosive welding process wherein an ECRM 242 is bonded onto the corrodible surface 221 to yield a coated surface 211, as previously described herein. In an embodiment, the coated surface 211 has an increased resistance to corrosion, due to the presence of the ECRM 242.

In an embodiment, a blank adaptor (e.g., a blank gauge adaptor, an annulus pressure adaptor, etc.) 260 may be inserted (e.g., engaged, positioned, placed, slid, introduced, etc.) in the gauge carrier slot 241, wherein the blank adaptor 260 is in sealing contact with the gauge carrier slot 241, thereby forming a sealing interface 261, as seen in FIG. 2C. As will be appreciated by one of skill in the art, and with the help of this disclosure, the inner diameter of the gauge carrier slot and the outer diameter of the blank adaptor are about the same, such that the blank adaptor fits snuggly into the gauge carrier slot, e.g., the blank adaptor is sealingly engaged or coupled into the gauge carrier slot. In an embodiment, at least a portion of the coated surface 211 is in sealing contact with at least a portion of an outer surface 262 of the blank adaptor 260, thereby forming the sealing interface 261. In an embodiment, the sealing interface 261 is characterized by a fluid tight seal, which seal does not allow a fluid to flow (e.g., traverse, cross, pass through, travel, etc.) between an exterior side of the gauge carrier 201 where an exterior surface 241a of the gauge carrier slot 241 is located and an interior side of the gauge carrier 201 where an interior surface 241b of the gauge carrier slot 241 is located, as seen in FIG. 2C. In an embodiment, when the blank adaptor 260 is in sealing contact with the gauge carrier slot 241, thereby forming a sealing interface 261, a fluid may not flow (e.g., traverse, cross, pass through, travel, etc.) between an exterior of the gauge carrier 201 (e.g., an annular flowbore 115 within wellbore 114) and an interior of the gauge carrier 201 (e.g., flowpath 220a).

The blank adaptor may be used in two configurations, e.g., an obturating configuration and a parameter monitoring configuration. Referring to the embodiment of FIG. 2C, the blank adaptor 260 is shown in the obturating configuration, wherein an adaptor obturating end 260a is inserted into the gauge carrier slot 241. In the obturating configuration, the adaptor obturating end 260a is located near the interior surface 241b of the gauge carrier slot 241. In the obturating configuration, a fluid may not flow (e.g., traverse, cross, pass through, travel, enter, penetrate etc.) through the adaptor obturating end 260a and into the blank adaptor 260. The blank adaptor 260 may further comprise an obturating end O-ring groove 263, wherein the obturating end O-ring groove 263 is located near the adaptor obturating end 260a, as seen in FIG. 2C. The obturating end O-ring groove 263 may further comprise one or more sealing elements (e.g., O-ring, backup seal, etc.), wherein at least a portion of an outer surface of the sealing element is in sealing contact with at least a portion of the coated surface 211, thereby forming a sealing interface that is characterized by a fluid tight seal, which seal does not allow a fluid to flow (e.g., traverse, cross, pass through, travel, etc.) between an exterior side of the gauge carrier 201 where an exterior surface 241a of the gauge carrier slot 241 is located and an interior side of the gauge carrier 201 where an interior surface 241b of the gauge carrier slot 241 is located, as seen in FIG. 2C.

In an embodiment, the blank adaptor 260 may be used in the parameter monitoring configuration, wherein an adaptor monitoring end 260b is inserted into the gauge carrier slot 241. In the parameter monitoring configuration, the adaptor monitoring end 260b is located near the interior surface 241b of the gauge carrier slot 241. The blank adaptor 260 may further comprise a monitoring end O-ring groove 264, wherein the monitoring end O-ring groove 264 is located near the adaptor monitoring end 260b, as seen in FIG. 2C. When the blank adaptor 260 is in the parameter monitoring configuration, the monitoring end O-ring groove 264 may further comprise one or more sealing elements (e.g., O-ring, backup seal, etc.), wherein at least a portion of an outer surface of the sealing element is in sealing contact with at least a portion of the coated surface 211, thereby forming a sealing interface that is characterized by a fluid tight seal, which seal does not allow a fluid to flow (e.g., traverse, cross, pass through, travel, etc.) between an exterior side of the gauge carrier 201 where an exterior surface 241a of the gauge carrier slot 241 is located and an interior side of the gauge carrier 201 where an interior surface 241b of the gauge carrier slot 241 is located.

In the parameter monitoring configuration, a gauge (e.g., a pressure gauge, a temperature gauge, etc.) may be inserted into a gauge aperture 265 of the blank adaptor 260. When the blank adaptor 260 is in the parameter monitoring configuration, the blank adaptor 260 is in sealing contact with the gauge carrier slot 241, thereby forming a sealing interface 261, and a fluid may not flow (e.g., traverse, cross, pass through, travel, etc.) between an exterior of the gauge carrier 201 (e.g., an annular flowbore 115 within wellbore 114) and an interior of the gauge carrier 201 (e.g., flowpath 220a). When the blank adaptor 260 is in the parameter monitoring configuration, the gauge aperture 265 may be in fluid contact with a space (e.g., space 220b) directly connected to the flowpath 220a, e.g., a fluid may freely flow between space 220b and flowpath 220a, as seen in FIG. 2B, and such fluid may further enter the gauge aperture 265.

In an embodiment, the gauge may be used to sense a condition (e.g., pressure, temperature, etc.) proximate the downhole servicing tool, such as for example a condition (e.g., pressure, temperature, etc.) within an interior space of the gauge carrier 201 (e.g., flowpath 220a) and/or a condition (e.g., pressure, temperature, etc.) within an exterior space of the gauge carrier 201 (e.g., an annular flowbore 115 within wellbore 114).

In an embodiment, the gauge and/or the blank adaptor 260 may have a securing strip (e.g., band, string, etc.) that may fit into hole 243a of the first gauge carrier slot portion 240a (or into hole 243b of the second gauge carrier slot portion 240b) to strap down and secure the gauge and/or the blank adaptor 260, such that the gauge and/or the blank adaptor 260 will not slide out of the gauge carrier slot 241 while the gauge carrier 201 performs a wellbore servicing operation. As will be appreciated by one of skill in the art, and with the help of this disclosure, the blank adaptor sliding out of the gauge carrier slot could cause the blank adaptor to no longer be in sealing contact with the gauge carrier slot, i.e., there would not be a sealing interface between the blank adaptor and the gauge carrier slot.

In an embodiment, the second housing segment 250 is located at the lower end of the housing 220. Referring to the embodiment of FIG. 2A, the second housing segment 250 generally comprises a cylindrical or tubular body 251 having a connecting surface (e.g., an internally or externally threaded surface) 252 located at the lower end of second housing segment 250. Such connecting surface 252 may be employed in making a connection to any suitable component, such as for example a packer 400.

In an embodiment, the downhole servicing tool 130 comprises a gauge carrier 200. A commercial example of such gauge carrier is 5-in. DYNASTRING gauge carrier, which is an external gauge carrier that has an offset outer diameter available from Halliburton Energy Services, Inc.

In an embodiment, the downhole servicing tool 130 comprises an actuation assembly (e.g., a valve, a bypass valve, a valve assembly, a shut-in valve, a circulation valve, a reverse circulation valve, a safety valve, a drain valve, a piston assembly, a sliding sleeve, a casing window, a setting tool, a packer, etc.), such as for example a valve assembly 300 and/or packer 400 further comprising a piston assembly. In such embodiment, the piston assembly may come in contact with a variety of fluids (e.g., nitrogen, oil, silicone oil, etc.), and as such one or more surfaces of the piston assembly may need to be resistant to corrosion. In an embodiment, a piston assembly comprises at least one coated surface.

In an embodiment, the piston assembly may exert a force on another component of the downhole servicing tool to yield a function, such as for example the piston assembly may slide a sleeve within a tool; the piston assembly may open a valve; the piston assembly may close a valve; the piston may set or unset a tool; or the piston may provide a motive or driving force for any desired relative movement between one or more operable components of a given downhole servicing tool; etc.

In an embodiment, the piston assembly may comprise an annular piston. Other types of pistons (e.g., a piston rod) may be used in different configurations, as will be apparent to those skilled in the art, and with the help of this disclosure.

Figure 3:
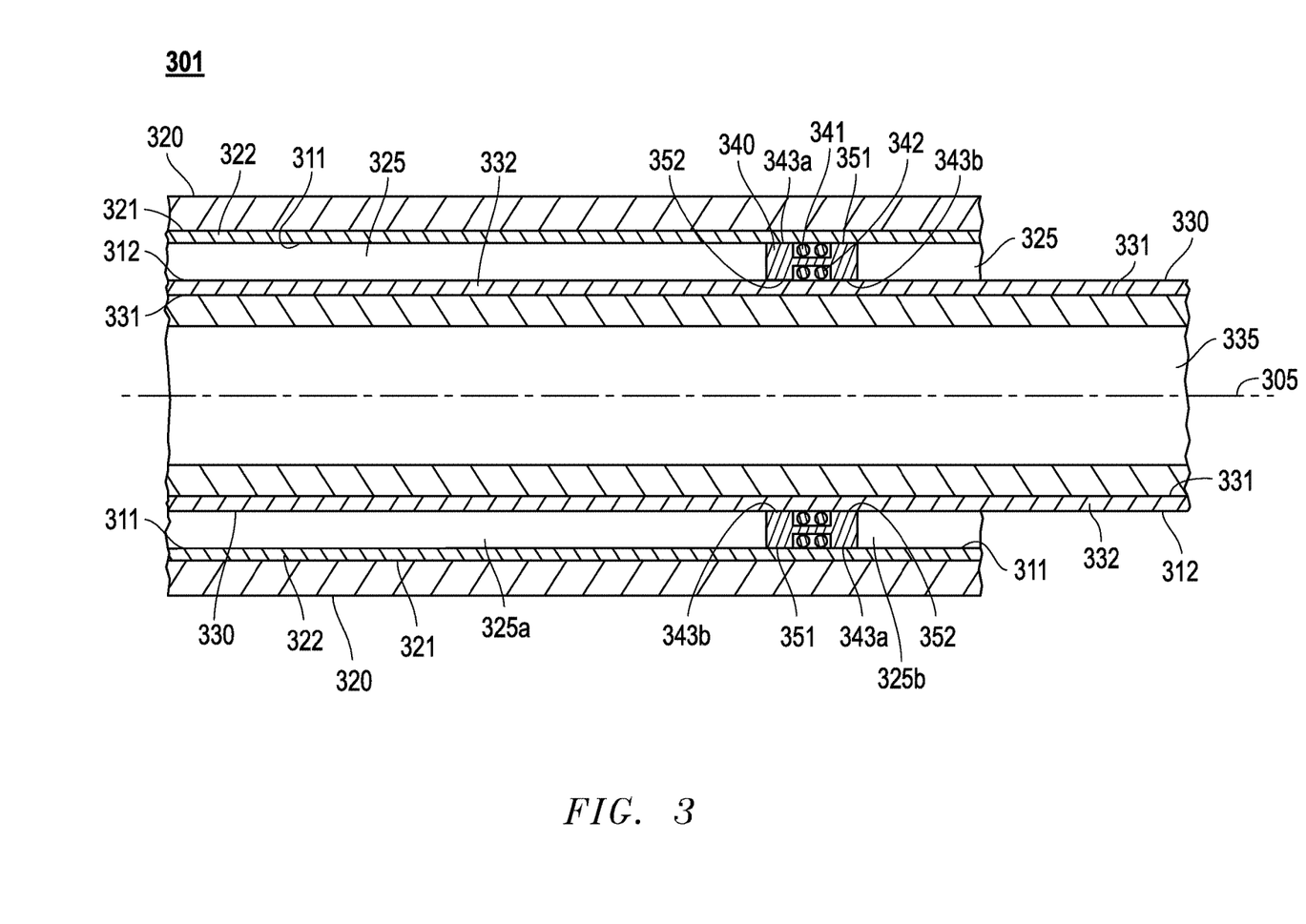
FIG. 3 is a cross-sectional view of an embodiment of a piston assembly comprising an annular piston.

Referring to the embodiment of FIG. 3, a piston assembly 301 comprises a housing 320, a mandrel 330, and an annular piston 340. Housing 320 comprises a cylindrical or tubular body that generally defines a continuous flowpath that allows fluid movement through housing 320. Housing 320 may be characterized with respect to a central or longitudinal axis 305. In an embodiment, housing 320 comprises a first corrodible surface 321. The first corrodible surface 321 represents the stationary material in an explosive welding process wherein a first ECRM 322 is bonded onto the first corrodible surface 321 to yield a first coated surface 311, as previously described herein.

In an embodiment, mandrel 330 generally comprises a cylindrical or tubular structure disposed within housing 320. In an embodiment, the mandrel 330 comprises a tubular body that generally defines a continuous flowpath 335 that allows fluid movement through mandrel 330. Mandrel 330 may be coaxially aligned with central axis 305 of housing 320. In an embodiment, mandrel 330 comprises a second corrodible surface 331. The second corrodible surface 331 represents the stationary material in an explosive welding process wherein a second ECRM 332 is bonded onto the second corrodible surface 331 to yield a second coated surface 312, as previously described herein.

Referring to the embodiment of FIG. 3, the housing 320 and the mandrel 330 may create an annular space 325 where the annular piston 340 resides. In an embodiment, the first coated surface 311 and the second coated surface 312 may define an annular space 325 where the annular piston 340 may reside. During the operation of the piston assembly 301, the annular piston 340 may slide/move within the annular space 325. In an embodiment, the annular piston 340 may comprise a first outer surface 343a and a second outer surface 343b. In an embodiment, the first outer surface 343a and/or the second outer surface 343b of the annular piston 340 may comprise a polymeric layer (e.g., fluoropolymer, polytetrafluoroethylene, etc.) to facilitate the movement of the annular piston 340 within the annular space 325. In an embodiment, the annular piston 340 defines a first annular space 325a located to the left of the annular piston 340 and a second annular space 325b located to the right of the annular piston 340.

In an embodiment, at least a portion of the first coated surface 311 is in sealing contact with at least a portion of the first outer surface 343a, thereby forming a first sealing interface 351. In an embodiment, at least a portion of the second coated surface 312 is in sealing contact with at least a portion of the second outer surface 343b, thereby forming a second sealing interface 352. In an embodiment, the first sealing interface 351 and/or the second sealing interface 352 are characterized by a fluid tight seal, which seal does not allow a fluid to flow (e.g., traverse, cross, pass through, travel, etc.) between the first annular space 325a and the second annular space 325b, as seen in FIG. 3.

In an embodiment, at least a portion of the annular space 325 may be filled with a fluid. In an embodiment, the first annular space 325a and/or the second annular space 325b may be filled with a fluid, such as for example a liquid, an oil, silicone oil, a gas, nitrogen, and the like, or combinations thereof. In an embodiment, the annular piston 340 may comprise one or more O-rings (e.g., O-ring 341, O-ring 342) to help seal the first annular space 325a from the second annular space 325b. The presence of a fluid in the annular space 325 (e.g., the presence of a wellbore fluid in a portion of the annular space such as 325a or 325b) may promote corrosion of annular surfaces. However, the presence of an ECRM on the annular surfaces (e.g., first coated surface 311, second coated surface 312) may enhance the corrosion resistance of such annular surfaces (e.g., coated surface 311, coated surface 312).

In an embodiment, the piston assembly 301 may be a pressure differential piston assembly. In such embodiment, the annular space 325 may experience pressure variations on either side of the annular piston 340 (e.g., within first annular space 325a, within the second annular space 325b, or combinations thereof), which pressure variations may cause the movement of the annular piston 340 within the annular space 325. For example, the first annular space 325a may be in fluid communication with the interior flowpath 335 (e.g., subjected to pumping and/or hydrostatic pressure from the surface) and the second annular space 325b may be in fluid communication with the surrounding formation (e.g., subject to ambient wellbore pressure) or vice-versa. Referring to the embodiment of FIG. 3, when a pressure in the first annular space 325a is greater than a pressure in the second annular space 325b, the annular piston 340 may move to the right. Similarly, when the pressure in the first annular space 325a is lower than the pressure in the second annular space 325b, the annular piston 340 may move to the left.

In an embodiment, the downhole servicing tool 130 comprises an actuation assembly (e.g., a circulating valve included in a drill stem testing tool) further comprising a piston assembly 301, wherein the piston assembly 301 comprises an annular piston 340. A commercial example of such an actuation assembly is OMNI DT circulating valve, which is an annulus pressure-operated, re-closeable circulating valve available from Halliburton Energy Services, Inc.

In an embodiment, the piston assembly may comprise a hydraulic holddown piston, such as for example a piston with a circular cross-section or a rod-type piston.

Figure 4:
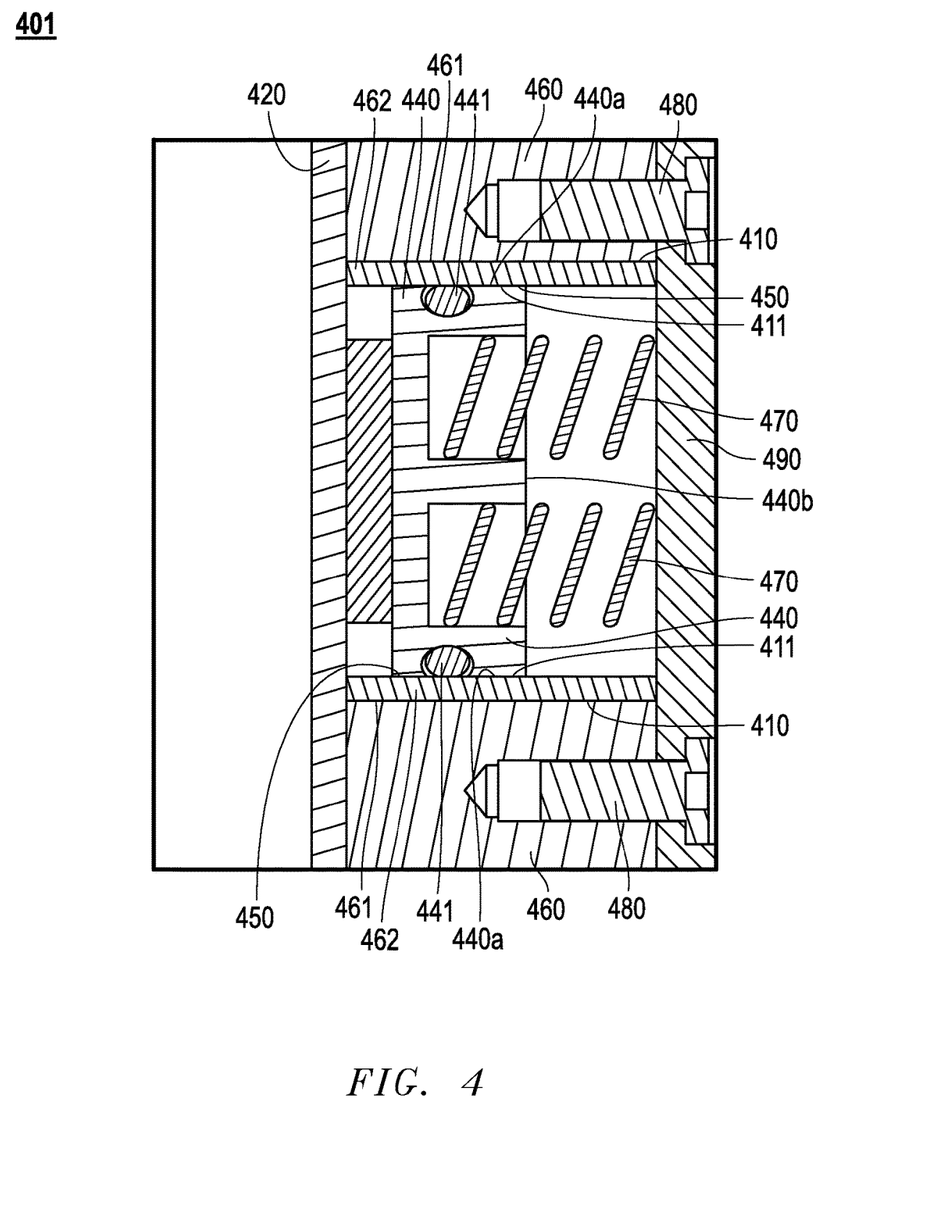
FIG. 4 is a cross-sectional view of an embodiment of a piston assembly comprising a hydraulic holddown mechanism.

Referring to the embodiment of FIG. 4, a piston assembly 401 comprises a housing 420, and a hydraulic holddown mechanism 460 further comprising a hydraulic holddown piston 440. In such embodiment, the hydraulic holddown mechanism 460 may be part of a packer 400 that is meant to anchor, hold down, secure or hold in place the housing 420. In an embodiment, the housing 420 may be part of a downhole servicing tool, and the hydraulic holddown mechanism 460 may anchor in place such downhole servicing tool.

In an embodiment, the hydraulic holddown mechanism 460 may comprise a piston slot 410. In an embodiment, the piston slot 410 is a port. In an embodiment, the hydraulic holddown mechanism 460 may comprise one, two, three, four, five, six, seven, eight, nine, ten, or more piston slots. Other numbers of piston slots may be used in different configurations, as will be apparent to those skilled in the art, and with the help of this disclosure.

Referring to the embodiment of FIG. 2C, the piston slot 410 comprises a piston slot corrodible surface 461. The piston slot corrodible surface 461 represents the stationary material in an explosive welding process wherein a piston slot ECRM 462 is bonded onto the piston slot corrodible surface 461 to yield a piston slot coated surface 411, as previously described herein. In an embodiment, the piston slot coated surface 411 has an increased resistance to corrosion, due to the presence of the piston slot ECRM 462.

In an embodiment, the hydraulic holddown piston 440 and one or more springs 470 may be positioned within the piston slot 410, wherein the springs 470 push against a metal strip 490 that may be held in place by one or more screws 480, as seen in FIG. 4. As will be appreciated by one of skill in the art, and with the help of this disclosure, the inner diameter of the piston slot and the outer diameter of the hydraulic holddown piston are about the same, such that the hydraulic holddown piston fits snuggly into the piston slot, e.g., the hydraulic holddown piston is sealingly engaged or coupled into the piston slot. In an embodiment, at least a portion of the piston slot coated surface 411 is in sealing contact with at least a portion of an outer surface 440a of the hydraulic holddown piston 440, thereby forming a sealing interface 450. In an embodiment, the sealing interface 450 is characterized by a fluid tight seal, which seal does not allow a fluid to flow (e.g., traverse, cross, pass through, travel, etc.) between an exterior surface 440b of the hydraulic holddown piston 440 and the housing 420, as seen in FIG. 4. In an embodiment, the hydraulic holddown piston 440 may comprise one or more O-rings (e.g., O-ring 441) to help enhance the seal of the sealing interface 450. In an embodiment, the hydraulic holddown piston 440 may move within the piston slot 410.

In an embodiment, the downhole servicing tool 130 comprises a packer further comprising a hydraulic holddown mechanism, wherein the hydraulic holddown mechanism comprises a hydraulic holddown piston 440. A commercial example of such a packer is RTTS packer, which is a full-opening, hookwall packer available from Halliburton Energy Services, Inc.

One or more of embodiments of a wellbore servicing system 100 comprising a downhole servicing tool like downhole servicing tool 130 having been disclosed, one or more embodiments of a wellbore servicing method employing such a wellbore servicing system 100 and/or such downhole servicing tools 130 are also disclosed herein. In an embodiment, a wellbore servicing method may generally comprise the steps of positioning a downhole servicing tool within a wellbore proximate to a zone of interest of a subterranean formation, allowing the downhole servicing tool to perform a servicing operation, and optionally removing the downhole servicing tool.

In an embodiment, a downhole servicing tool may be incorporated within a conveyance string such as conveyance string 112 of FIG. 1, and may be positioned within a wellbore (e.g., run in hole) such as wellbore 114. For example, in the embodiment of FIG. 1, conveyance string 112 has incorporated therein a downhole servicing tool 130 and is run in hole (e.g., wellbore).

In some embodiments, such as for example in the embodiment of FIG. 1, the wellbore may be cased with a casing such as casing 120. Also, in such an embodiment, the casing 120 may be secured in place with cement, for example, such that a cement sheath (e.g., cement 122) surrounds the casing 120 and fills the void space between the casing 120 and the walls of the wellbore 114. Although the embodiment of FIG. 1 illustrates, and the following disclosure may reference, a cased, cemented wellbore, one of skill in the art will appreciate that the methods disclosed herein may be similarly employed in an uncased wellbore or a cased, uncemented wellbore, for example, where the casing is secured utilizing a packer or the like.

In an embodiment, a wellbore servicing operation employing a downhole servicing tool comprising a coated surface may comprise a wide variety of servicing operations, such as for example drilling, completing, working over, stimulating, perforating, fracturing, repairing, otherwise servicing the wellbore, or in any way preparing the wellbore for the recovery of materials residing in a subterranean formation penetrated by the wellbore, or combinations thereof.

For example, a gauge carrier like gauge carrier 201 as shown in FIGS. 2A, 2B, and 2C may be used in drill stem testing, hydraulic fracturing, chemical treatments, gravel packing, well stimulation, reservoir characterization, etc. When the gauge carrier has more gauge carrier slots than the number of gauges needed and/or used for a particular servicing operation, the gauge slots that do not carry a gauge may receive a blank adaptor in an obturating configuration to ensure that the slot is sealed during the servicing operation. For example, if a gauge carrier has 8 gauge carrier slots and only 5 gauges are used, 3 of the slots will receive blank adaptors in an obturating configuration to ensure a proper seal.

In an embodiment, the wellbore servicing operation is a perforating and/or fracturing operation. Generally, perforating may refer to forming one or more perforations and/or perforation clusters (e.g., a plurality of associated or closelypositioned perforations) within a wellbore and/or subterranean formation. Generally, fracturing may refer to forming one or more fractures within a wellbore and/or subterranean formation.

In an embodiment, forming perforations and/or fractures may occur by any suitable method or apparatus. For example, in an embodiment, the perforations and/or fractures may be formed by a fluid jetting apparatus (e.g., a hydrajetting tool). In such embodiment, the fluid jetting apparatus may comprise one or more ports that are selectively openable and/or closeable to fluid flow, wherein at least a portion of the port comprises a coated surface of the type disclosed herein. A fluid jetting apparatus may flow a fluid under high pressure through a port (e.g., a port opened to fluid flow) to form perforations and/or fractures. In such embodiment, the presence of a coated surface within a port may offer enhanced corrosion resistance to the fluids that may be flowed through the port. Furthermore, such ports may be selectively opened and closed via a sliding sleeve that the actuated via an annular piston having one or more coated surfaces as disclosed herein with reference to FIG. 3.

In an embodiment, the wellbore servicing operation is a zonal isolation operation, wherein a downhole servicing tool may be employed to isolate two or more zones (e.g., adjacent zones) of a wellbore and/or subterranean formation from each other. In an embodiment, the downhole servicing tool comprises a packer further comprising a hydraulic holddown mechanism like hydraulic holddown mechanism 460.

In an embodiment, a packer may be set by applying a force (e.g., weight, pressure, etc.) onto the packer, wherein the packer may isolate an up-hole zone from a down-hole zone. In such embodiment, the packer may remain in a set mode as long as a pressure in the up-hole zone is higher than a pressure in the down-hole zone. As will be appreciated by one of skill in the art, and with the help of this disclosure, if the pressure in the up-hole zone is lower than the pressure in the down-hole zone, this situation gives rise to a large force that may undesirably push the packer out of the well. In an embodiment, the packer comprises a hydraulic holddown mechanism (e.g., a hydraulic holddown mechanism like hydraulic holddown mechanism 460 as shown in FIG. 4), further comprising a hydraulic holddown piston like hydraulic holddown piston 440. When the pressure in the down-hole zone is larger than the pressure in the up-hole zone, the hydraulic pistons (e.g., hydraulic holddown pistons like hydraulic holddown pistons 440) get pushed against the casing; the larger the pressure differential (e.g., the larger the pressure in the down-hole zone when compared to the pressure in the up-hole zone), the harder the hydraulic pistons (e.g., hydraulic holddown pistons like hydraulic holddown pistons 440) get pushed against the casing, thereby anchoring the packer into the casing in that particular position.

During the zonal isolation operation, the hydraulic holddown mechanism (e.g., a hydraulic holddown mechanism like hydraulic holddown mechanism 460 as shown in FIG. 4) is exposed to corrosive conditions (e.g., formation fluids, produced hydrocarbons, formation water, produced water, etc.), and as such the presence of an ECRM on the corrodible surfaces as disclosed herein reduces the corrosion damage to the hydraulic holddown mechanism.

In an embodiment, the wellbore servicing operation is a drill stem testing (DST) operation, which refers to well tests conducted with a drill string (e.g., drill stem) still in the hole. Drill stem testing is usually conducted with a shut-in downhole servicing tool that allows the well to be opened and closed at the bottom of the hole with a surface-actuated valve. Drill stem testing generally provides data about a natural resource reservoir (e.g., subterranean formation), such as for example pressure, temperature, permeability, hydrocarbon composition, etc.

In an embodiment, the downhole servicing tool comprises a drill stem testing tool or a component (e.g., sub or sub-assembly) thereof, such as for example a valve assembly, a gauge carrier, a packer, a perforated pipe, a shoe, and the like. In such embodiment, the drill stem testing tool may be used in a drill stem testing servicing operation.

In an embodiment, the downhole servicing tool comprises a DST tool like DST tool 130 as shown in FIG. 1, wherein the DST tool comprises a valve assembly like valve assembly 300, a gauge carrier like gauge carrier 200, a packer like packer 400, a perforated pipe like perforated pipe 500, and a shoe like shoe 600. In an embodiment, a DST tool may further comprise bypass valves, safety joints, sample containers or chambers, perforating guns, etc. Generally, one or more pressure and/or temperature gauges are customarily mounted into the DST tool (e.g., into a gauge carrier component like gauge carrier 201 as shown in FIGS. 2A, 2B, and 2C) and the data/results may be read and interpreted after the test is completed. Alternatively, the data from the gauges may be read in real time.

In an embodiment, the DST tool may be connected to the downhole end of the drill string. The DST too may be run in hole until the DST tool is proximate a zone of interest of a subterranean formation. While the DST is run in hole, a bypass valve (e.g., a valve assembly like valve assembly 300 further comprising a piston assembly like piston assembly 301 as shown in FIG. 3) of the DST tool may be opened, such that a drilling fluid that fills the wellbore may freely enter/flow inside the DST tool, thereby preventing undesirable pressure surges that could undesirably fracture the subterranean formation to be tested. A shoe like shoe 500 may be a guiding shoe that may facilitate or aid in the insertion, traversal and placement of the DST tool in the wellbore and/or zone of interest of a subterranean formation.

Once the DST tool is positioned, a surface-actuated packer like packer 400 of the DST tool may be set/actuated, thereby isolating the subterranean formation from an annulus formed between the drill string and the casing (e.g., annular flowbore 115 within wellbore 114, as shown in FIG. 1), and forcing any produced fluids (e.g., hydrocarbons) to enter only the drill string. In an embodiment, a packer or component thereof (e.g., a packer assembly like packer 400) may further comprise a piston assembly like piston assembly 301 as shown in FIG. 3 to actuate the packer (e.g., assist with setting or unsetting the packer).

Produced fluids may enter the DST tool via a perforated pipe like perforated pipe 500 and may travel up the drill string due to an inherent reservoir pressure. The drill string may be sometimes filled with a cushion, such as for example a water cushion, an inert gas (usually nitrogen) cushion, which prevents an undesirable surge in the hydrocarbons (e.g., formation fluids) through the drill string, which could damage the gauges present in the gauge carrier (e.g., a gauge carrier like gauge carrier 201 as shown in FIGS. 2A, 2B, and 2C) that is part of the DST tool. During the DST, hydrocarbons are temporarily produced through the drill string. The DST tool allows the natural resource reservoir (e.g., subterranean formation) to flow to the surface and/or into a sample chamber located within the DST tool. The hydrocarbons (e.g., formation fluids, produced fluids) are allowed to flow to the surface for a time period determined by an operator, then the wellbore is shut-in to allow for pressure build up, followed by allowing the hydrocarbons (e.g., formation fluids, produced fluids) to flow again to the surface for testing purposes (e.g., well production potential testing, fluid composition testing, etc.). A shut-in valve (e.g., a valve assembly like valve assembly 300 further comprising a piston assembly like piston assembly 301 as shown in FIG. 3) may be then closed to stop the flow of fluids to the surface and allow for pressure build up within the DST tool. The pressure and/or temperature may be recorded by the gauges of the gauge carrier (e.g., a gauge carrier like gauge carrier 201 as shown in FIGS. 2A, 2B, and 2C) and it may provide information about the formation permeability, formation dimensions, etc. Once the DST is completed, a drilling fluid may be pumped down into the wellbore to kill the well and fill the drill string, and the DST tool may be removed from the wellbore and/or the subterranean formation, and brought back to the surface for analysis of subterranean formation parameters, such as for example reading the pressure and/or temperature from the gauges that were used with the drill stem testing tool.

During drill stem testing, the drill stem testing tool is exposed to corrosive conditions, and as such the presence of an ECRM on the corrodible surfaces as disclosed herein reduces the corrosion damage to the drill stem testing tool.

In an embodiment, a downhole servicing tool such as downhole servicing tool 130, a wellbore servicing system such as wellbore servicing system 100 comprising a downhole servicing tool such as downhole servicing tool 130, a wellbore servicing method employing such a wellbore servicing system 100 and/or such a downhole servicing tool 130, or combinations thereof may be advantageously employed in the performance of a wellbore servicing operation. For example, the presence of the coated surfaces in the downhole servicing tool may advantageously lower the corrosion damage that such a downhole servicing tool may undergo.

When the coated surfaces are present in ports and/or slots, the ability to explosively weld an ECRM onto the corrodible surface of such ports and/or slots may be advantageous when compared to the conventional methods. Generally, conventional methods may involve sealing with epoxy a corrosion resistant material into a port and/or slot, and such epoxy seal may leak over time, leading to corrosion. Additional advantages of the wellbore servicing tool 130 and methods of using same may be apparent to one of skill in the art viewing this disclosure.

ADDITIONAL DISCLOSURE

The following are nonlimiting, specific embodiments in accordance with the present disclosure:

A first embodiment, which is a method of making a downhole servicing tool comprising explosively welding a corrosion resistant material to a corrodible surface of the downhole servicing tool to yield a coated surface, wherein the coated surface comprises an explosively-welded corrosion resistant material.

A second embodiment, which is the method of the first embodiment wherein the corrodible surface comprises low alloy steel, carbon steel, mild steel, low-carbon steel, low-alloy carbon steel, plain-carbon steel, medium carbon steel, high-carbon steel, ultra-high-carbon steel, or combinations thereof.

A third embodiment, which is the method of one of the first through second embodiments wherein the corrosion resistant material comprises a corrosion resistant alloy, high alloy steel, stainless steel, nickel alloy, Inconel, a corrosion resistant metal, titanium, zirconium, or combinations thereof.

A fourth embodiment, which is the method of one of the first through third embodiments wherein the explosively-welded corrosion resistant material is characterized by a thickness of from about 0.1 mm to about 10 mm.

A fifth embodiment, which is the method of one of the first through fourth embodiments wherein the corrosion resistant material and the corrodible surface comprise dissimilar materials.

A sixth embodiment, which is the method of one of the first through fifth embodiments wherein the corrodible surface has a tubular and/or cylindrical geometry.

A seventh embodiment, which is the method of one of the first through sixth embodiments wherein the corrodible surface comprises a corrodible surface in a port, a corrodible surface in a slot, a corrodible surface on a tubular, a corrodible surface on a mandrel, a corrodible surface in a housing, or combinations thereof.

An eighth embodiment, which is the method of one of the first through seventh embodiments wherein two or more components of the downhole servicing tool are in sealing contact with each other, thereby forming a sealing interface.

A ninth embodiment, which is the method of the eighth embodiment wherein the sealing interface comprises at least a portion of a first surface of a first component in sealing contact with at least a portion of a second surface of a second component, wherein all or a portion of the first surface and/or all or a portion of the second surface may comprise the coated surface.

A tenth embodiment, which is the method of one of the first through ninth embodiments wherein explosively welding the corrosion resistant material to the corrodible surface of the downhole servicing tool involves detonating an explosive placed proximate the corrosion resistant material.

An eleventh embodiment, which is the method of the tenth embodiment wherein the explosive comprises cyclotrimethylene trinitramine (RDX) characterized by molecular formula $C_3H_6N_6O_6$; pentaerythritol tetranitrate (PETN) characterized by molecular formula $C_5H_8N_4O_{12}$; trinitrotoluene (TNT) characterized by molecular formula $C_7H_5N_3O_6$; trinitrophenylmethylinitramine characterized by molecular formula $C_7H_5N_5O_8$, also known as tetryl; nitroguanidine characterized by molecular formula $CH_4N_4O_2$; lead azide characterized by molecular formula $Pb(N_3)_2$; ammonium nitrate characterized by molecular formula $NH_4NO_3$; ammonium nitrate sensitized with fuel oil; ammonium perchlorate characterized by molecular formula $NH_4ClO_4$; amatol; sodatol; Composition B; Composition C4; dynamite; detasheet; or combinations thereof.

A twelfth embodiment, which is the method of one of the first through eleventh embodiments wherein the downhole servicing tool comprises a carrier, a gauge carrier, a gauge, a recorder, a port, a slot, a carrier gun, a piston assembly, a valve, a bypass valve, a valve assembly, a shut-in valve, a circulation valve, a reverse circulation valve, a safety valve, a drain valve, a drill stem testing tool, a nozzle, a packer, a safety joint, a sample container, a perforating gun, a perforated pipe, a shoe, a sampling tool, a logging tool, a fracturing tool, a drilling tool, a completion tool, a perforating tool, a repair tool, a work over tool, or any components thereof.

A thirteenth embodiment, which is the method of the twelfth embodiment wherein the drill stem testing tool comprises a valve assembly, a gauge carrier, a packer, a perforated pipe, and a shoe.

A fourteenth embodiment, which is the method of the thirteenth embodiment wherein the drill stem testing tool further comprises a bypass valve, a safety joint, a sample container, a perforating gun, or combinations thereof.

A fifteenth embodiment, which is the method of one of the thirteenth through fourteenth embodiments wherein the gauge carrier comprises a gauge carrier slot, wherein the gauge carrier slot comprises a coated surface.

A sixteenth embodiment, which is the method of the fifteenth embodiment wherein the gauge carrier comprises a blank adaptor further comprising a gauge, wherein the blank adaptor is in a parameter monitoring configuration, wherein the blank adaptor is in sealing contact with the gauge carrier slot, thereby forming a sealing interface, and wherein the gauge senses a condition proximate the downhole servicing tool.

A seventeenth embodiment, which is the method of the ninth embodiment wherein the first component comprises a gauge carrier slot and the second component comprises a blank adaptor.

An eighteenth embodiment, which is the method of the twelfth embodiment wherein the piston assembly comprises a housing, a mandrel and an annular piston, wherein the housing comprises a first coated surface, wherein the mandrel comprises a second coated surface, wherein the first coated surface and the second coated surface define an annular space, and wherein the annular piston moves within the annular space.

A nineteenth embodiment, which is the method of the ninth embodiment wherein the first component comprises a mandrel and/or a housing and the second component comprises an annular piston.

A twentieth embodiment, which is the method of the eighteenth embodiment wherein the piston assembly is a differential pressure piston assembly, and wherein at least a portion of the annular space comprises a fluid.

A twenty-first embodiment, which is the method of the twelfth embodiment wherein the port is selectively openable and/or closeable to fluid flow.

A twenty-second embodiment, which is the method of the twenty-first embodiment wherein the port is configured for a perforating and/or fracturing operation.

A twenty-third embodiment, which is the method of the twelfth embodiment wherein the packer comprises a hydraulic holddown mechanism further comprising a hydraulic holddown piston and a piston slot, wherein the hydraulic holddown piston moves within the piston slot.

A twenty-fourth embodiment, which is the method of the ninth embodiment wherein the first component comprises a hydraulic holddown piston and the second component comprises a piston slot.

A twenty-fifth embodiment, which is a downhole servicing tool comprising a coated surface, wherein the coated surface comprises an explosively-welded corrosion resistant material.

A twenty-سixth embodiment, which is the downhole servicing tool of the twenty-fifth embodiment wherein the explosively-welded corrosion resistant material comprises a corrosion resistant alloy, high alloy steel, stainless steel, nickel alloy, Inconel, a corrosion resistant metal, titanium, zirconium, or combinations thereof.

A twenty-seventh embodiment, which is the downhole servicing tool of one of the twenty-fifth through twenty-sixth embodiments comprising a carrier, a gauge carrier, a gauge, a recorder, a port, a slot, a carrier gun, a piston assembly, a valve, a bypass valve, a valve assembly, a shut-in valve, a circulation valve, a reverse circulation valve, a safety valve, a drain valve, a drill stem testing tool, a nozzle, a packer, a safety joint, a sample container, a perforating gun, a perforated pipe, a shoe, a sampling tool, a logging tool, a fracturing tool, a drilling tool, a completion tool, a perforating tool, a repair tool, a work over tool, or any components thereof.

A twenty-eighth embodiment, which is the downhole servicing tool of the twenty-seventh embodiment wherein the drill stem testing tool comprises a valve assembly, a gauge carrier, a packer, a perforated pipe, and a shoe.

A twenty-ninth embodiment, which is the downhole servicing tool of one of the twenty-seventh through twenty-eighth embodiments wherein the gauge carrier comprises a gauge carrier slot and a blank adaptor further comprising a gauge, wherein the blank adaptor is in a parameter monitoring configuration, wherein the gauge carrier slot comprises a coated surface in sealing contact with the blank adaptor, thereby forming a sealing interface, and wherein the gauge senses a condition proximate the downhole servicing tool.

A thirtieth embodiment, which is the downhole servicing tool of the twenty-seventh embodiment wherein the piston assembly comprises a housing, a mandrel and an annular piston, wherein the housing comprises a first coated surface, wherein the mandrel comprises a second coated surface, wherein the first coated surface and the second coated surface define an annular space, wherein the annular piston moves within the annular space, wherein the annular piston comprises a first outer surface and a second outer surface, wherein at least a portion of the first outer surface of the annular piston forms a first sealing interface with at least a portion of the first coated surface, and wherein at least a portion of the second outer surface of the annular piston forms a second sealing interface with at least a portion of the second coated surface.

A thirty-first embodiment, which is a wellbore servicing system comprising a casing string disposed within a wellbore, a conveyance string at least partially disposed within the casing string and having a downhole servicing tool incorporated therein, wherein the downhole servicing tool comprises a coated surface, and wherein the coated surface comprises an explosively-welded corrosion resistant material.

A thirty-second embodiment, which is the wellbore servicing system of the thirty-first embodiment, wherein two or more components of the downhole servicing tool are in sealing contact with each other, thereby forming a sealing interface comprising at least a portion of a first surface of a first component in sealing contact with at least a portion of a second surface of a second component, wherein all or a portion of the first surface and/or all or a portion of the second surface may comprise the coated surface.

A thirty-third embodiment, which is the wellbore servicing system of one of the thirty-first through thirty-second embodiments, wherein the downhole servicing tool is a drill stem testing tool comprising a valve assembly, a gauge carrier, a packer, a perforated pipe, and a shoe.

A thirty-fourth embodiment, which is a wellbore servicing method comprising positioning a conveyance string having a downhole servicing tool incorporated therein within a casing string disposed within a wellbore, wherein the conveyance string is positioned such that the downhole servicing tool is proximate to a zone of interest within a subterranean formation, wherein the downhole servicing tool comprises a drill stem testing tool, wherein the drill stem testing tool comprises one or more coated surfaces, wherein the coated surface comprises an explosively-welded corrosion resistant material, performing a drill stem testing operation, wherein the drill stem testing tool comprises a gauge carrier comprising one or more gauge carrier slots and one or more blank adaptors further comprising one or more gauges to log data about a natural resource reservoir, wherein the gauge carrier slot comprises at least a portion of a coated surface in sealing contact with at least a portion of an outer surface of the blank adaptor, thereby forming a sealing interface, wherein the gauge senses a condition proximate the downhole servicing tool, and retrieving data from the gauges.

A thirty-fifth embodiment, which is a drill stem testing tool comprising a gauge carrier comprising one or more gauge carrier slots and one or more blank adaptors further comprising one or more gauges, wherein the gauge carrier slot comprises a coated surface, wherein the coated surface comprises an explosively-welded corrosion resistant material, wherein the gauge carrier slot comprises at least a portion of the coated surface in sealing contact with at least a portion of an outer surface of the blank adaptor, thereby forming a sealing interface, wherein the gauge senses a condition proximate the drill stem testing tool.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of making a downhole servicing tool comprising:
   explosively welding a corrosion resistant material to a corrodible surface of the downhole servicing tool to yield a coated surface, wherein the coated surface comprises an explosively-welded corrosion resistant material;
   mounting a gauge carrier into the downhole servicing tool, wherein the gauge carrier comprises one or more gauge carrier slots and one or more blank adaptors further comprising one or more gauges to log data about a natural resource reservoir, wherein the gauge carrier slot comprises at least a portion of a coated surface, and wherein the one or more gauges sense a condition proximate the downhole servicing tool; and
   forming a sealing interface by sealingly contacting the one or more blank adaptors with the one or more gauge carrier slots.

2. The method of claim 1 wherein the corrodible surface comprises low alloy steel, carbon steel, mild steel, low-carbon steel, low-alloy carbon steel, plain-carbon steel, medium carbon steel, high-carbon steel, ultra-high-carbon steel, or combinations thereof.

3. The method of claim 1 wherein the corrosion resistant material comprises a corrosion resistant alloy, high alloy steel, stainless steel, nickel alloy, Inconel, a corrosion resistant metal, titanium, zirconium, or combinations thereof.

4. The method of claim 1 wherein the explosively-welded corrosion resistant material is characterized by a thickness of from about 0.1 mm to about 10 mm.

5. The method of claim 1 wherein the corrosion resistant material and the corrodible surface comprise dissimilar materials.

6. The method of claim 1 wherein the corrodible surface has a tubular and/or cylindrical geometry.

7. The method of claim 1 wherein the corrodible surface comprises a corrodible surface in a port, a corrodible surface in a slot, a corrodible surface on a tubular, a corrodible surface on a mandrel, a corrodible surface in a housing, or combinations thereof.

8. The method of claim 1 wherein two or more components of the downhole servicing tool are in sealing contact with each other, thereby forming a sealing interface.

9. The method of claim 8 wherein the sealing interface comprises at least a portion of a first surface of a first component in sealing contact with at least a portion of a second surface of a second component, wherein all or a portion of the first surface and/or all or a portion of the second surface may comprise the coated surface.

10. The method of claim 9 wherein the first component comprises a gauge carrier slot and the second component comprises a blank adaptor.

11. The method of claim 9 wherein the first component comprises a mandrel and/or a housing and the second component comprises an annular piston.

12. The method of claim 9 wherein the first component comprises a hydraulic holddown piston and the second component comprises a piston slot.

13. The method of claim 1 wherein explosively welding the corrosion resistant material to the corrodible surface of the downhole servicing tool involves detonating an explosive placed proximate the corrosion resistant material.

14. The method of claim 13 wherein the explosive comprises cyclotrimethylene trinitramine (RDX) characterized by molecular formula $C_3H_6N_6O_6$; pentaerythritol tetranitrate (PETN) characterized by molecular formula $C_5H_8N_4O_{12}$; trinitrotoluene (TNT) characterized by molecular formula $C_7H_5N_3O_6$; trinitrophenylmethylinitramine characterized by molecular formula $C_7H_5N_5O_8$, also known as tetryl; nitroguanidine characterized by molecular formula $CH_4N_4O_2$; lead azide characterized by molecular formula $Pb(N_3)_2$; ammonium nitrate characterized by molecular formula $NH_4NO_3$; ammonium nitrate sensitized with fuel oil; ammonium perchlorate characterized by molecular formula $NH_4ClO_4$; amatol; sodatol; Composition B; Composition C4; dynamite; detasheet; or combinations thereof.

15. The method of claim 1 wherein the downhole servicing tool comprises at least one of a drill stem testing tool, a sampling tool, a completion tool, and a perforating tool or at least one of a logging tool and a drilling tool.

16. The method of claim 15 wherein the drill stem testing tool comprises a valve assembly, a packer, a perforated pipe, and a shoe.

17. The method of claim 16 wherein the drill stem testing tool further comprises a bypass valve, a safety joint, a sample container, a perforating gun, or combinations thereof.

18. The method of claim 15 wherein there is a piston assembly comprising a housing, a mandrel and an annular piston, wherein the housing comprises a first coated surface, wherein the mandrel comprises a second coated surface, wherein the first coated surface and the second coated surface define an annular space, and wherein the annular piston moves within the annular space.

19. The method of claim 18 wherein the piston assembly is a differential pressure piston assembly, and wherein at least a portion of the annular space comprises a fluid.

20. The method of claim 15 wherein there is a port selectively openable and/or closeable to fluid flow.

21. The method of claim 20 wherein the port is configured for a perforating and/or fracturing operation.

22. The method of claim 15 wherein there is a packer comprising a hydraulic holddown mechanism further comprising a hydraulic holddown piston and a piston slot, wherein the hydraulic holddown piston moves within the piston slot.

23. The method of claim 1, wherein the blank adaptor is in a parameter monitoring configuration.

24. A downhole servicing tool comprising a gauge carrier comprising one or more gauge carrier slots and one or more blank adaptors further comprising one or more gauges, wherein the gauge carrier slot comprises a coated surface, wherein the coated surface comprises an explosively-welded corrosion resistant material, wherein the gauge carrier slot comprises at least a portion of the coated surface in sealing contact with at least a portion of an outer surface of the blank adaptor, thereby forming a sealing interface, wherein the gauge senses a condition proximate the downhole servicing tool.

25. The downhole servicing tool of claim 24 wherein the explosively-welded corrosion resistant material comprises a corrosion resistant alloy, high alloy steel, stainless steel, nickel alloy, Inconel, a corrosion resistant metal, titanium, zirconium, or combinations thereof.

26. The downhole servicing tool of claim 24 comprising at least one of a drill stem testing tool, a sampling tool, a completion tool, and a perforating tool or at least one of a logging tool and a drilling tool.

27. The downhole servicing tool of claim 26 wherein the drill stem testing tool comprises a valve assembly, a packer, a perforated pipe, and a shoe.

28. The downhole servicing tool of claim 26 wherein there is a piston assembly comprising a housing, a mandrel and an annular piston, wherein the housing comprises a first coated surface, wherein the mandrel comprises a second coated surface, wherein the first coated surface and the second coated surface define an annular space, wherein the annular piston moves within the annular space, wherein the annular piston comprises a first outer surface and a second outer surface, wherein at least a portion of the first outer surface of the annular piston forms a first sealing interface with at least a portion of the first coated surface, and wherein at least a portion of the second outer surface of the annular piston forms a second sealing interface with at least a portion of the second coated surface.

29. A wellbore servicing system comprising:
a casing string disposed within a wellbore;
a conveyance string at least partially disposed within the casing string and having a downhole servicing tool incorporated therein,
wherein the downhole servicing tool comprises a gauge carrier comprising one or more gauge carrier slots and one or more blank adaptors further comprising one or more gauges, wherein the gauge carrier slot comprises a coated surface, wherein the coated surface comprises an explosively-welded corrosion resistant material, wherein the gauge carrier slot comprises at least a portion of the coated surface in sealing contact with at least a portion of an outer surface of the blank adaptor, thereby forming a sealing interface, wherein the gauge senses a condition proximate downhole servicing tool.

30. The wellbore servicing system of claim 29, wherein two or more components of the downhole servicing tool are in sealing contact with each other, thereby forming a sealing interface comprising at least a portion of a first surface of a first component in sealing contact with at least a portion of a second surface of a second component, wherein all or a portion of the first surface and/or all or a portion of the second surface may comprise the coated surface.

31. The wellbore servicing system of claim 29, wherein the downhole servicing tool is a drill stem testing tool comprising a valve assembly, a packer, a perforated pipe, and a shoe.

32. A wellbore servicing method comprising:
positioning a conveyance string having a downhole servicing tool incorporated therein within a casing string disposed within a wellbore, wherein the conveyance string is positioned such that the downhole servicing tool is proximate to a zone of interest within a subterranean formation, wherein the downhole servicing tool comprises a drill stem testing tool, wherein the drill stem testing tool comprises one or more coated surfaces, wherein the one or more coated surfaces comprise an explosively-welded corrosion resistant material;
performing a drill stem testing operation, wherein the drill stem testing tool comprises a gauge carrier comprising one or more gauge carrier slots and one or more blank adaptors further comprising one or more gauges to log data about a natural resource reservoir, wherein the gauge carrier slot comprises at least a portion of a coated surface in sealing contact with at least a portion of an outer surface of the blank adaptor, thereby forming a sealing interface, wherein the gauge senses a condition proximate the downhole servicing tool; and
retrieving data from the gauges.

33. A drill stem testing tool comprising a gauge carrier comprising one or more gauge carrier slots and one or more blank adaptors further comprising one or more gauges, wherein the gauge carrier slot comprises a coated surface, wherein the coated surface comprises an explosively-welded corrosion resistant material, wherein the gauge carrier slot comprises at least a portion of the coated surface in sealing contact with at least a portion of an outer surface of the blank adaptor, thereby forming a sealing interface, wherein the gauge senses a condition proximate the drill stem testing tool.

\* \* \* \* \*